United States Patent
Lee et al.

(10) Patent No.: US 9,817,467 B2
(45) Date of Patent: Nov. 14, 2017

(54) ENERGY STORAGE DEVICE AND ENERGY STORAGE SYSTEM INCLUDING THE SAME

(71) Applicant: LG ELECTRONICS INC., Seoul (KR)

(72) Inventors: Seungyong Lee, Seoul (KR); Jihoon Ko, Seoul (KR); Heesoo Moon, Seoul (KR); Jeonghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 162 days.

(21) Appl. No.: 14/825,782

(22) Filed: Aug. 13, 2015

(65) Prior Publication Data
US 2016/0048194 A1    Feb. 18, 2016

(30) Foreign Application Priority Data
Aug. 14, 2014    (KR) .................. 10-2014-0105755

(51) Int. Cl.
*H02J 7/00*     (2006.01)
*G06F 1/32*     (2006.01)
*B05B 13/02*    (2006.01)
*H02J 3/26*     (2006.01)
*H02J 3/32*     (2006.01)
*H02J 3/38*     (2006.01)

(52) U.S. Cl.
CPC ........ *G06F 1/3287* (2013.01); *B05B 13/0292* (2013.01); *G06F 1/3212* (2013.01); *H02J 3/26* (2013.01); *H02J 3/32* (2013.01); *H02J 3/383* (2013.01); *Y02E 10/563* (2013.01); *Y02E 40/50* (2013.01); *Y02E 70/30* (2013.01)

(58) Field of Classification Search
USPC ................................ 320/101, 112, 128, 137
See application file for complete search history.

(56) References Cited

U.S. PATENT DOCUMENTS

| 2011/0068624 A1* | 3/2011 | Dibachi ............. H02J 7/35 307/18 |
| 2011/0140648 A1* | 6/2011 | Lee ..................... H02J 3/32 320/101 |
| 2011/0210694 A1* | 9/2011 | Uehashi .............. H02J 3/32 320/101 |
| 2012/0153888 A1 | 6/2012 | Jung |
| 2013/0062970 A1 | 3/2013 | Maier et al. |

(Continued)

FOREIGN PATENT DOCUMENTS

DE    20 2012 009 347 U1    1/2013
EP       2 672 603 A1       12/2013

*Primary Examiner* — Brian Ngo
(74) *Attorney, Agent, or Firm* — Birch, Stewart, Kolasch & Birch, LLP

(57) ABSTRACT

Discussed are an energy storage device and an energy storage system including the energy storage device. The energy storage device includes at least one battery pack, a power conversion unit to convert, into DC power, AC power from a first phase from among three phases of an internal power network in a charging mode of the energy storage device, and to convert the DC power stored in the at least one battery pack into the AC power in a discharging mode of the energy storage device, a communication module to exchange data with an external energy storage device, and a controller to control the power conversion unit.

19 Claims, 7 Drawing Sheets

(56) References Cited

U.S. PATENT DOCUMENTS

| | | | |
|---|---|---|---|
| 2014/0159662 A1* | 6/2014 | Furui | B25F 5/02 320/112 |
| 2014/0334211 A1* | 11/2014 | Somani | H02M 7/53875 363/131 |
| 2015/0280457 A1* | 10/2015 | Jung | H02J 7/0004 320/106 |
| 2016/0036235 A1* | 2/2016 | Getsla | H02J 3/383 307/80 |

* cited by examiner

ENERGY STORAGE DEVICE AND ENERGY STORAGE SYSTEM INCLUDING THE SAME

CROSS-REFERENCE TO RELATED APPLICATION

This application claims the priority benefit of Korean Patent Application No. 10-2014-0105755, filed on Aug. 14, 2014, in the Korean Intellectual Property Office, the disclosure of which is incorporated herein by reference.

BACKGROUND OF THE INVENTION

1. Field of the Invention

Embodiments of the present invention relate to an energy storage device and an energy storage system including the same, and more particularly to an energy storage device capable of exchanging data with an external energy storage device connected to one of three phases of an internal power network under the condition that the energy storage device is connected to another one of the three phases, and an energy storage system including the same.

2. Description of the Related Art

Recently, as existing energy resources such as petroleum and coal are depleted, interest in alternative energy sources is increasing. In particular, a solar cell which directly converts solar energy into electric energy is highlighted as a next-generation alternative energy source.

It is necessary to supply or store energy, based on new renewable energy. To this end, an energy storage device is used to store energy.

SUMMARY OF THE INVENTION

Therefore, the embodiments of the present invention has been made in view of the above problems, and it is an object of the present invention to provide an energy storage device capable of exchanging data with an external energy storage device, and an energy storage system including the same.

In accordance with an aspect of the present invention, the above and other objects can be accomplished by the provision of an energy storage device including at least one battery pack, a power conversion unit to convert, into DC power, AC power from a first phase from among three phases of an internal power network in a charging mode, and to convert the DC power stored in the at least one battery pack into the AC power in a discharging mode, a communication module to exchange data with an external energy storage device, and a controller to control the power conversion unit.

In accordance with another aspect of the present invention, there is provided an energy storage system including a photovoltaic module including a solar cell module, and an AC power conversion module to convert DC power supplied from the solar cell module into AC power, and to supply the AC power to an internal power network, and an energy storage device including at least one battery pack, and a power conversion unit to convert, into the DC power, the AC power from a first phase from among three phases of the internal power network in a charging mode, and to convert the DC power stored in the at least one battery pack into the AC power in a discharging mode.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EMBODIMENTS

Reference will now be made in detail to the embodiments of the present invention, examples of which are illustrated in the accompanying drawings.

Although "module" or "unit" is suffixed to constituent elements described in the following description, this is intended only for ease of description of the specification. The suffixes themselves have no meaning or function to distinguish the constituent element using the suffix from the constituent element using no suffix. The suffixes "module" and "unit" may be used interchangeably.

Figure 1:
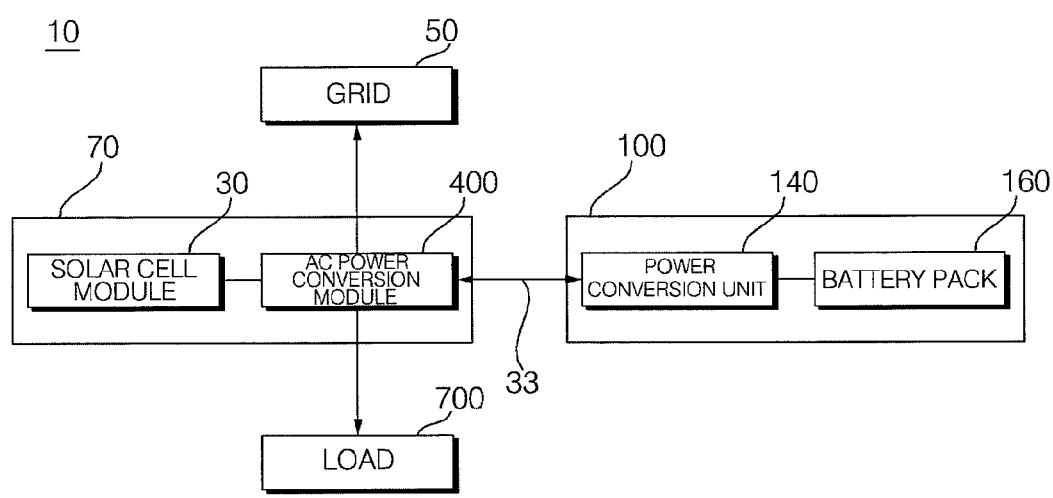
FIG. 1 is a block diagram illustrating an energy storage system according to an embodiment of the present invention.

FIG. 1 is a block diagram illustrating an energy storage system according to an embodiment of the present invention. Referring to FIG. 1, the energy storage system, which is designated by reference numeral "10", may include a photovoltaic module 70 and an energy storage device 100. In addition, the energy storage system 10 may include a grid 50 and a load 700.

The photovoltaic module 70 and energy storage device 100 may be electrically connected via an internal power network 33. The energy storage device 100 may include at least one battery pack 160 and a power conversion unit 140. The power conversion unit 140 converts externally input power into DC power in a charging mode of the energy storage device 100, and converts DC power stored in the battery pack 160 in a discharging mode of the energy storage device 100.

The photovoltaic module 70 may include a solar cell module 30 and an AC power conversion module 400. The AC power conversion module 400 converts DC power supplied from the solar cell module 30 into AC power, and supplies the AC power to the internal power network. The solar cell module 30 may include a plurality of solar cells.

Figure 3:
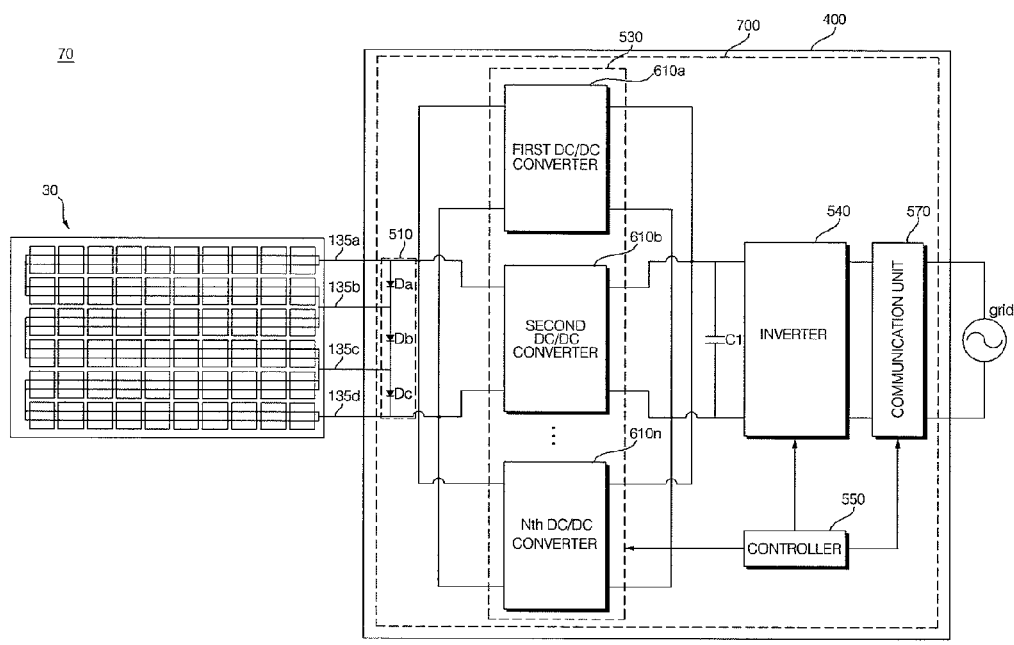
FIG. 3 is a block diagram illustrating an inner configuration of the photovoltaic module illustrated in FIG. 1.

The AC power conversion module 400 is a power conversion module converting DC power from the solar cell module 30 into AC power and outputting the AC power. The AC power conversion module 400 may include a bypass diode unit 510 (FIG. 3), a converter unit 530 (FIG. 3), a capacitor C1 (FIG. 3), an inverter 540 (FIG. 3), a controller 550 (FIG. 3), and a communication unit 570 (FIG. 3). The AC power conversion module 400 may also be referred to as a "micro inverter".

In the illustrated embodiment of the present invention, the photovoltaic module 70 may directly output AC power to the internal power network 33, based on the configuration including the solar cell module 30, and the AC power conversion module 400 to convert DC power supplied from the solar cell module 30 into AC power and to supply the AC power to the internal power network 33. In this regard, the photovoltaic module 70 may be referred to as a "photovoltaic AC module".

Meanwhile, the energy storage device 100 may store AC power supplied from the photovoltaic module 70 in the battery pack 160 included therein. Meanwhile, the grid 50 and load 700 may be electrically connected to the AC power conversion module 400 included in the photovoltaic module 70. That is, in the energy storage system 10 of FIG. 1, the energy storage device 100, grid 50, and load 700 are connected to the AC power conversion module 400 of the photovoltaic module 70. Accordingly, the AC power conversion module 400 of the photovoltaic module 70 may supply converted AC power to the internal power network 33, grid 50 or load 700.

In accordance with the above-described energy storage system 10, it is unnecessary for the power conversion unit 140 in the energy storage device 100 to directly supply AC power to the grid 50 or load 700 and, as such, loss of power generated during power conversion in the power conversion unit 140 of the energy storage device 100 is reduced. In this regard, total power conversion efficiency is increased.

Figure 2:
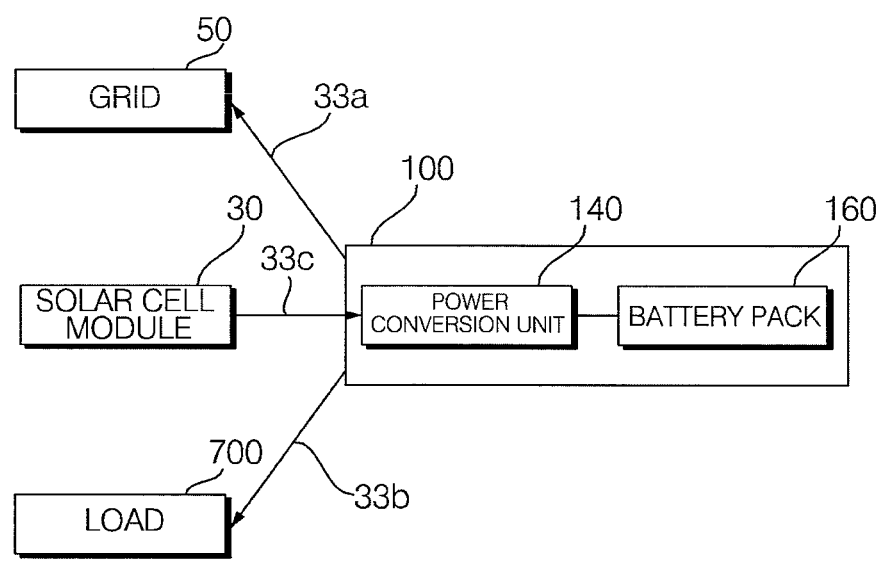
FIG. 2 is a block diagram illustrating an energy storage system according to another embodiment of the present invention.

FIG. 2 is a block diagram illustrating an energy storage system according to another embodiment of the present invention. The energy storage system of FIG. 2, namely, an energy storage system 15, is similar to the energy storage system 10 of FIG. 1, but differs from the energy storage system 10 of FIG. 1 in that the AC power conversion module 400 is eliminated.

That is, the AC power conversion module 400 is eliminated from the photovoltaic module 70, and the solar cell module 30 is connected to the energy storage device 100 via an internal power network 33c. Meanwhile, in addition to the solar cell module 30, the grid 50 and load 700 are connected to the energy storage device 100 via internal power networks 33a and 33b, respectively.

In accordance with the above-described energy storage system 15, it may be possible to directly store DC power from the solar cell module 30 in the battery pack 160, based on the energy storage device 100. In this instance, the power conversion unit 140 may directly bypass DC power without a separate power conversion.

Meanwhile, in a discharging mode, the energy storage device 100 may convert DC power stored in the battery pack 160 into AC power, based on the power conversion unit 140, and may supply the converted AC power to the grid 50 or load 700 via the corresponding internal power network 33a or 33b.

On the other hand, the solar cell module 30 may supply AC power, based on an internal power network 33c, after DC power conversion, differently than the above-described case. The power conversion unit 140 of the energy storage device 100 may again convert the AC power from the solar cell module 30 into DC power and, as such, may supply the DC power to the battery pack 160. In this instance, in a discharging mode, the energy storage device 100 may convert DC power stored in the battery pack 160 into AC power, based on the power conversion unit 140, and may supply the converted AC power to the grid 50 or load 700 via the corresponding internal power network 33a or 33b.

FIG. 3 is a block diagram illustrating an inner configuration of the photovoltaic module illustrated in FIG. 1.

Referring to FIG. 3, the photovoltaic module 70 may include a solar cell module 30 and an AC power conversion module 400.

The solar cell module 30 may include a plurality of solar cells. Each solar cell is a semiconductor device converting solar energy into electric energy. For example, the solar cell may be a silicon solar cell, a compound semiconductor solar cell, a tandem solar cell, a dye-sensitized solar cell, a CdTe or CIGS type solar cell, or the like.

The solar cells may be electrically connected in series, in parallel, or in series and parallel. In the illustrated instance, 6 strings are formed, and each string includes 10 solar cells. However, various modifications may be made to the illustrated instance.

Meanwhile, a plurality of solar cell strings may be electrically connected to first to fourth conductive lines 135a, 135b, 135c, and 135d corresponding thereto. The first to fourth conductive lines 135a, 135b, 135c, and 135d may be electrically connected to bypass diodes Da, Db, and Dc included in the AC power conversion module 400.

The AC power conversion module 400 is a power conversion module converting DC power from the solar cell module 30 into DC power and outputting the DC power. The AC power conversion module 400 may include a bypass diode unit 510, a converter unit 530, a capacitor C1, an inverter 540, a controller 550, and a communication unit 570.

The bypass diode unit 510 may include the bypass diodes Da, Db, and Dc, each of which is arranged between corresponding ones of the first to fourth conductive lines 135a, 135b, 135c, and 135d. In this instance, the number of bypass diodes is one or more, and is preferably less than the number of conductive lines by one.

Each of the bypass diodes Da, Db, and Dc receives photovoltaic DC power from the solar cell module 30, in particular, corresponding ones of the first to fourth conductive lines 135a, 135b, 135c, and 135d in the solar cell module 30. When a reverse voltage is generated from DC power supplied from at least one of the first to fourth conductive lines 135a, 135b, 135c, and 135d, the bypass diodes Da, Db, and Dc may bypass the supplied DC power.

Meanwhile, an input voltage Vpv output from the bypass diode unit 510 is input to the converter unit 530. The converter unit 530 converts the input voltage Vpv output from the bypass diode unit 510. Meanwhile, the converter unit 530 may be referred to as a "first power conversion unit".

For example, the converter unit 530 may convert a DC input voltage, namely, the input voltage Vpv, into a pseudo DC voltage. Accordingly, the pseudo DC power may be stored in the capacitor C1. Meanwhile, both ends of the capacitor C1 may be DC links. Accordingly, the capacitor C1 may be referred to as a "DC-link capacitor".

In another example, the converter unit 530 may convert the DC input voltage Vpv into a boosted DC voltage. In this instance, accordingly, the boosted DC voltage may be stored in the DC-link capacitor C1.

The inverter 540 may convert the DC voltage stored in the DC-link capacitor C1 into an AC voltage. Meanwhile, the inverter 540 may be referred to as a "second power conversion unit".

For example, the inverter 540 may convert the pseudo DC power converted by the converter unit 530 into an AC voltage. In another example, the inverter 540 may convert the DC power boosted by the converter unit 530 into an AC voltage.

Meanwhile, the converter unit 530 preferably includes a plurality of interleaving converters 610a to 610n (also referred to as a first to Nth DC/DC converter, respectively), for pseudo DC voltage conversion or boosted DC voltage conversion. As the interleaving converters, tap inductor converters, fly-back converters, or the like may be used.

Meanwhile, the AC voltage converted by the inverter 540 may be output to the outside via the communication unit 570 under the condition that certain information is added to the AC voltage.

That is, the communication unit 570 may add a carrier frequency signal including certain information to the AC voltage converted by the inverter 540, based on power line communication (PLC) and, as such, may output AC voltage including information to the internal power network 33 or the like.

In this instance, the information may include at least one of generated electric power information of the photovoltaic module including the solar cell module, input and output current information of the photovoltaic module, input and output voltage information of the photovoltaic module, operation state information of the photovoltaic module, and error information of the photovoltaic module. Such information may be generated by the controller 550.

Figure 4:
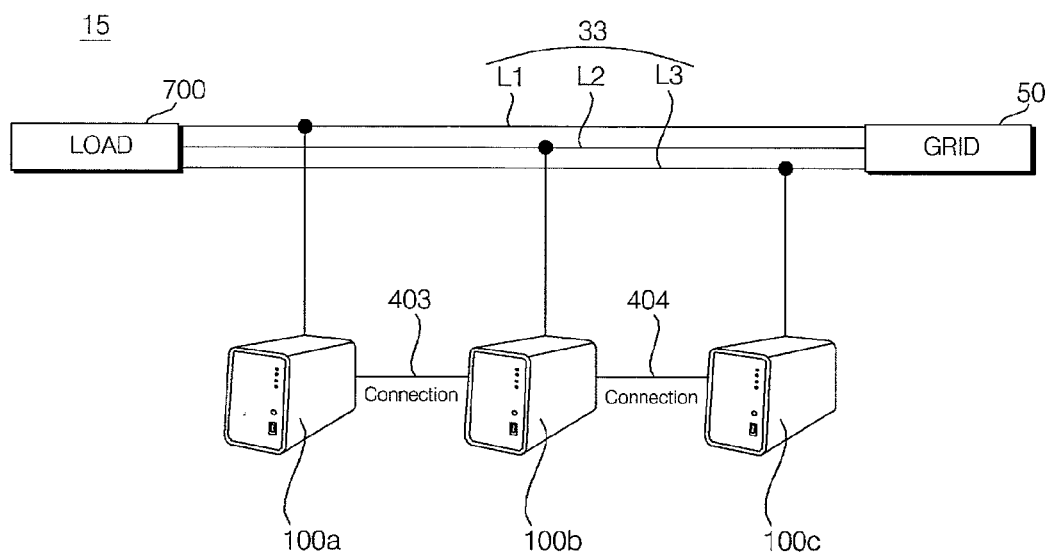
FIG. 4 is a block diagram illustrating energy storage devices included in the energy storage system illustrated in FIG. 2.

FIG. 4 is a block diagram illustrating energy storage devices included in the energy storage system illustrated in FIG. 2. Referring to FIG. 4, in the energy storage system 15, the load 700, grid 50, and energy storage devices 100a, 100b, and 100c may be electrically connected via the internal power network 33.

Meanwhile, when the internal power network 33 is a three-phase power network 33, the first energy storage device 100a may be connected to a first one of the three phases of the internal power network 33, namely, a first phase L1, the second energy storage device 100b may be connected to a second one of the three phases of the internal power network 33, namely, a second phase L2, and the third energy storage device 100c may be connected to a third one of the three phases of the internal power network 33, namely, a third phase L3. The energy storage devices 100a, 100b, and 100c preferably share voltage information of each phase via connections 403 and 404, for a three-phase equilibrium.

To this end, each of the energy storage devices 100a, 100b, and 100c preferably includes a communication module 150 (FIG. 5) and, as such, may transmit or receive voltage information of the corresponding phase via the communication module 150.

Meanwhile, among the energy storage devices 100a, 100b, and 100c, the first energy storage device 100a may function as a master, and the second and third energy storage devices 100b and 100c may function as slaves. In this instance, the amount of discharged power supplied to each phase in a discharging mode may be constant under the control of the first energy storage device 100a.

To this end, the first energy storage device 100a may receive voltage information of all phases. In this instance, the controller of the first energy storage device 100a, namely, a controller 170, may calculate discharged power amounts of respective phases, based on the voltage information of respective phases, and may transmit information of the calculated discharged power amounts to the second and third energy storage devices 100b and 100c.

Figure 5:
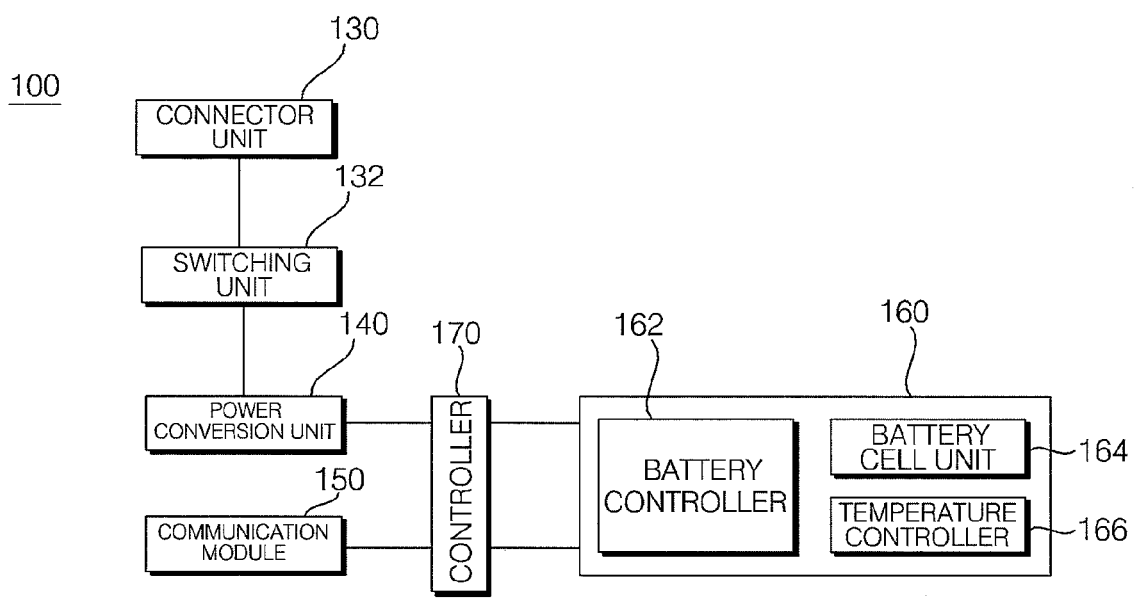
FIG. 5 is a block diagram illustrating an inner configuration of the energy storage device illustrated in FIG. 1 or 2.

FIG. 5 is a block diagram illustrating an inner configuration of the energy storage device illustrated in FIG. 1 or 2. Referring to FIG. 5, the energy storage device 100 may include a connector unit 130, a switching unit 132, a power conversion unit 140, a communication module 150, and an internal battery pack 160.

The connector unit 130 may include an AC power terminal. In accordance with an embodiment of the present invention, the energy storage device 100 receives AC power supplied from an internal power network 33 in a charging mode or outputs AC power converted therein to the internal power network 33. In this regard, the connector unit 130 is only provided with an AC power terminal without requiring a DC power terminal.

Meanwhile, when the energy storage device is electrically connected to the internal power network 33, which is a three-phase power network, the connector unit 130 may be electrically connected to the first phase L1 from among the three phases. In this instance, the connector unit 130 may receive AC power from the first phase L1 of the internal power network 33 in a charging mode, and may output AC power converted by the power conversion unit 140 to the first phase L1 in a discharging mode.

The switching unit 132 is arranged between the connector unit 130 and the power conversion unit 140. In the charging mode, the switching unit 132 may operate to prevent generation of an inrush current.

To this end, the switching unit 132 may include an AC relay. When the switching unit 132 includes a DC relay, a resistor should be additionally provided because AC power flows between the connector unit 130 and the power conversion unit 140. However, when an AC relay is used, it is unnecessary to provide a separate resistor. Accordingly, it is possible to reduce manufacture costs and to make compact the switching unit 132.

The power conversion unit 140 may convert externally input power into DC power in a charging mode, and may convert DC power stored in the battery pack 160 in a discharging mode.

In detail, in the charging mode, the power conversion unit 140 may receive AC power supplied from the internal power network 33, and may convert the AC power into DC power. In the discharging mode, the power conversion unit 140 may convert DC power stored in the battery pack 160, and may supply the DC power to the internal power network 33 via the connector unit 130.

To this end, the power conversion unit 140 may include a bidirectional AC/DC converter receiving AC power from the internal power network 33 and converting the AC power into DC power in a charging mode while converting DC power stored in the battery pack 160 into AC power in a discharging mode.

The communication module 150 may exchange data with an external energy storage device. In particular, the communication module 150 may exchange data with energy storage devices 100b and 100c disposed adjacent thereto.

To this end, the communication module 150 may perform wired communication or wireless communication. For wired communication, the communication module 150 may perform power line communication (PLC). For wireless communication, the communication module 150 may perform Bluetooth communication, Wi-Fi communication, or Zigbee communication. Other ways of communication is also usable.

Meanwhile, when the energy storage device 100 is electrically connected to the internal power network 33, which is a three-phase power network, the connector unit 130 may be electrically connected to the first phase L1 from among the three phases.

In this instance, the communication module 150 may exchange data with external energy storage devices respectively connected to the second and third phases of the internal power network 33. In detail, the communication module 150 may receive voltage information of the second phase and voltage information of the third phase, and may transmit voltage information of the first phase to the external energy storage devices.

Using the voltage information of each phase as described above, the controller 170 may control an amount of discharged power during discharging operation of the energy storage device 100 while controlling an amount of charged power during charging operation of the energy storage device 100, for the 3-phase equilibrium in the internal power network 33.

For example, the controller 170 may control an amount of power to be supplied to the first phase in a discharging mode, based on voltage information of the second and third phases received from the communication module 150.

Meanwhile, in the discharging mode, the controller 170 may perform a control operation to calculate amounts of power supplied to the second and third phases, based on the amount of power to be supplied to the first phase, and to transmit information as to the calculated second and third phase power amounts to the outside via the communication module 150.

In addition, the controller 170 may control each constituent unit of the energy storage device 100. In particular, the controller 170 may control the power conversion unit 140 and a battery controller 162 included in the battery pack 160.

As described above, when the energy storage device 100 is connected to the first phase of the three-phase internal power network, the controller 170 may control an amount of power converted in the power conversion unit 140, based on voltage information of each phase. In particular, the controller 170 may control an amount of discharged power in a discharging mode or an amount of charged power in a charging mode.

Meanwhile, the controller 170 may receive information of storable power from the battery pack 160, may calculate an amount of charged power in a charging mode, based on the received information, and may control the power conversion unit 140, based on the calculated charged power amount.

On the other hand, in a charging mode, the controller 170 may perform a control operation to initialize the battery controller 162 of the battery pack 160 when the power conversion unit 140 operates, and to charge the battery pack 160 with externally input power in a converted state when the battery controller 162 completes preparation of operation.

The battery pack 160 may include a battery cell unit 164 and a temperature controller 166, in addition to the battery controller 162. These elements are installed in a battery pack case.

The battery cell unit 164 includes a plurality of battery cells. These battery cells may be connected in series, in parallel, or in combination of series and parallel.

The temperature controller 166 adjusts temperature of the battery cell unit 164. To this end, the temperature controller 166 may include a temperature sensor to sense temperature of the battery cell unit 164. Meanwhile, the temperature controller 166 may further include a fan driver to drive a fan, based on a sensed temperature, in order to lower temperature of the battery cell unit 164. The fan driver is preferably disposed in a region corresponding to an area where the battery cells are arranged, for enhancement of temperature control efficiency.

Meanwhile, the battery controller 162 performs whole control operation for battery pack 160. For example, the battery controller 162 controls the temperature controller 166 when temperature of the battery cell unit 164 is increased to a predetermined temperature or above, in order to lower temperature of the battery cell unit 164.

In another example, the battery controller 162 may adjust balance of DC voltages stored in respective battery cells of the battery cell unit 164. In this instance, the battery controller 162 may sense DC voltages stored in respective battery cells, and may adjust DC voltage balance, based on the sensed DC voltages.

Meanwhile, the battery controller 162 may transmit state information of the battery pack 160 (temperature, levels of stored voltages, etc.) to the communication module 150. In addition, the battery controller 162 may receive state information of the energy storage device 100 (desired voltage level, etc.) from the communication module 150.

Figure 6:
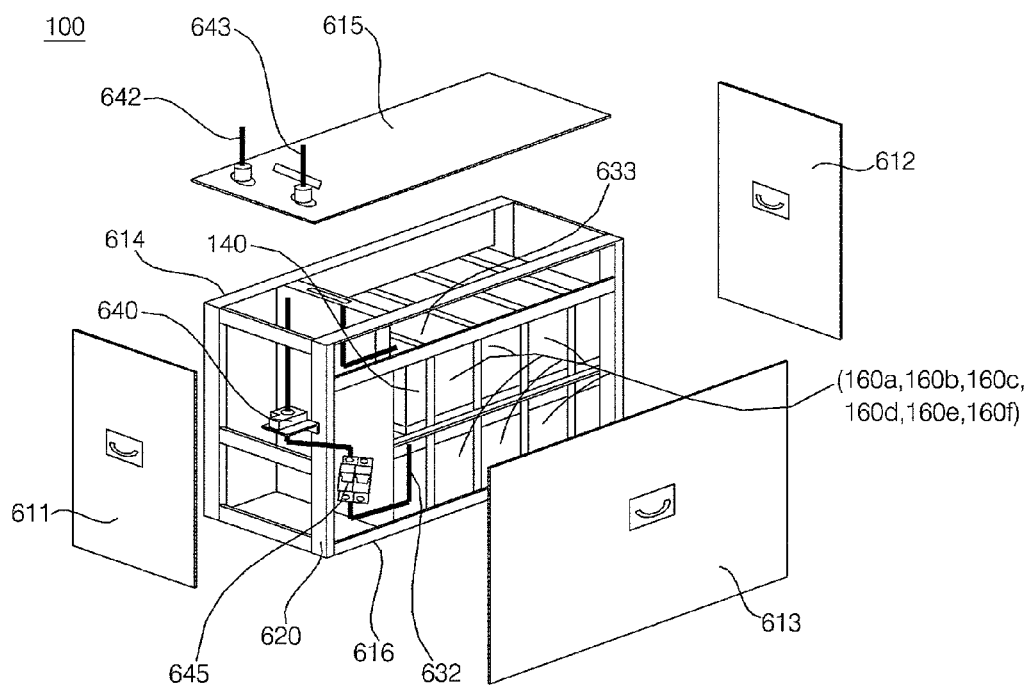
FIG. 6 is an exploded perspective view of the energy storage device illustrated in FIG. 1 or 2.

FIG. 6 is an exploded perspective view of the energy storage device illustrated in FIG. 1 or 2. Referring to FIG. 6, the energy storage device 100 may include, in addition to the power conversion unit 140, a frame 620, a plurality of battery packs 160*a* to 160*f* mounted in the frame 620, together with the power conversion unit 140, and a top case 615, a bottom case 616, a front case 611, a rear case 612, a right case 613 and a left case 614, which encase the frame 620, power conversion unit 140 and battery packs 160*a* to 160*f*. In particular, each case may be detachably attached to the frame 620.

Meanwhile, the energy storage device 100 may be provided, at the top case 615 thereof, with a first terminal 642 and a second terminal 643, which protrude outwards. The first terminal 642 and second terminal 643 may be implemented to be included in the connector unit 130 described in conjunction with FIG. 5, etc.

The energy storage device 100 may further include a power sensor 640 and a cut-off unit 645, which are arranged between the connector unit 130 and the power conversion unit 140. The power sensor 640 may sense external power in a charging mode or may sense converted AC power in a discharging mode. In detail, the power sensor 640 may sense AC current.

The cut-off unit 645 may cut off supply of power when the voltage sensed by the power sensor 640 is equal to or higher than a predetermined level and, as such, may protect elements in the energy storage device 100.

Figure 7:
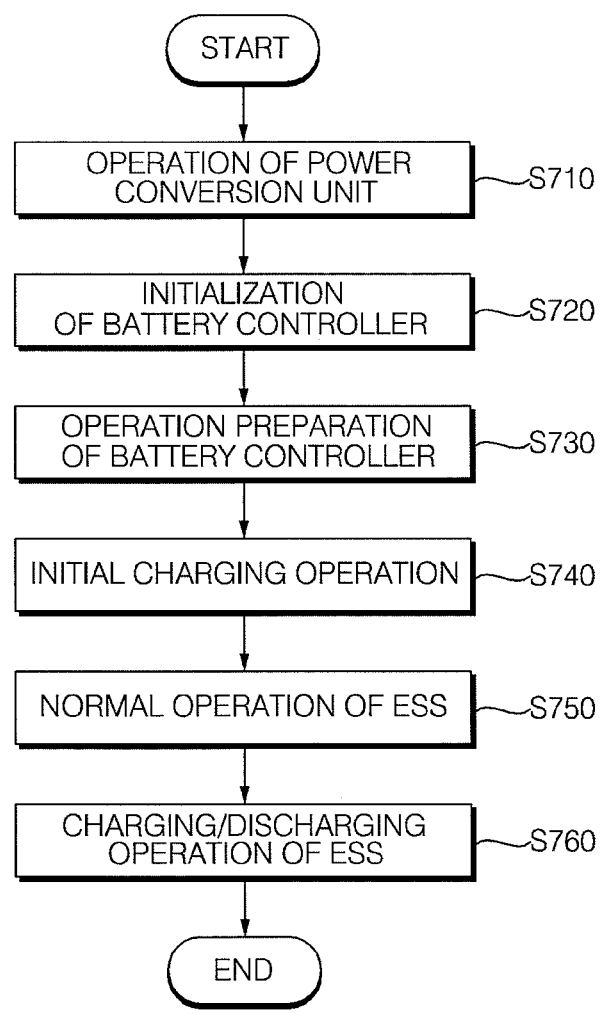
FIG. 7 is a flowchart illustrating operation of the energy storage device in FIG. 1 or 2.

FIG. 7 is a flowchart illustrating operation of the energy storage device in FIG. 1 or 2. Referring to FIG. 7, in a charging mode, the controller 170 operates the power conversion unit 140 (S710). Thereafter, the controller 170 transmits a first message signal to the battery controller 162. For example, the controller 170 transmits a "1" signal.

Subsequently, the battery controller 162 of the battery pack 160 performs an initialization operation, based on the first message signal (S720). Then, the controller 170 transmits a second message signal to the power conversion unit 140. For example, the controller 170 transmits a "1" signal.

The battery controller 162 of the battery pack 160 then performs preparation of operation (S730). Then, the controller 170 transmits a third message signal to the power conversion unit 140. For example, the controller 170 transmits a "1" signal.

Based on the second and third message signals, the power conversion unit 120 then performs an initial charging operation (S740). The controller 170 then transmits a fourth message signal to the battery controller 162. For example, the controller 170 transmits a "0" signal.

Thereafter, the controller 170 determines whether or not the energy storage device 100 normally operates (S750). When the energy storage device 100 normally operates, the controller 170 transmits a fifth message signal to the battery controller 162. For example, the controller 170 transmits a "1" signal.

Then, the energy storage device 100 normally performs a charging operation or a discharging operation (S760).

The controller 170 sets each message in operations S710 to S760, and transmits the set message to the internal battery controller 162 or power conversion unit 140 and, as such, it may be possible to easily and rapidly control the battery controller or power conversion unit 140.

In accordance with each embodiment of the present invention, the energy storage device includes at least one battery pack, a power conversion unit to convert, into DC power, AC power from a first phase from among three phases of an internal power network in a charging mode, and to convert DC power stored in the battery pack into AC power in a discharging mode, a communication module to exchange data with an external energy storage device, and a controller to control the power conversion unit and, as such, may exchange data with an external energy storage device connected to another one of the three phases.

In particular, it may be possible to eliminate a voltage imbalance of the three-phase internal power network by controlling the amount of power to be supplied to the first phase from among the three phases of the internal power network in the discharging mode, based on voltage information of the second and third phases from among the three phases of the internal power network.

Meanwhile, a switching unit for preventing generation of the inrush current is arranged between the connector unit and the power conversion unit and, as such, it may be possible to prevent generation of the inrush current in the charging mode.

In particular, an AC relay may be used as the switching unit and, as such, manufacture costs may be reduced.

Meanwhile, there is provided a power sensor arranged between the connector unit and the power conversion unit, to sense the AC power from the first phase in the charging mode and to sense the converted AC power in the discharging mode, and a cut-off unit to cut off supply of power when a voltage sensed by the power sensor is equal to or higher than a predetermined level, and as such, it may be possible to protect elements included in the energy storage device.

In addition, the energy storage system according to the embodiment of the present invention includes a photovoltaic module including a solar cell module, and an AC power conversion module to convert DC power supplied from the solar cell module into AC power, and to supply the AC power to an internal power network, and an energy storage device including at least one battery pack, and a power conversion unit to convert, into DC power, AC power from a first phase from among three phases of the internal power network in a charging mode, and to convert DC power stored in the battery pack into AC power in a discharging mode, and as such, loss of power generated during power conversion in the power conversion unit of the energy storage device is reduced. As a result, total power conversion efficiency is increased.

The energy storage device according to the present invention and the energy storage system including the same are not limited to the configurations and methods according to the above-described embodiments, but the entirety or a portion of the embodiments may be selectively combined to be configured into various modifications.

In addition, although the example embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An energy storage device comprising:
   at least one battery pack;
   a power conversion unit to convert, into DC power, AC power from a first phase from among three phases of an internal power network in a charging mode, and to convert the DC power stored in the at least one battery pack into the AC power in a discharging mode;
   a communication module to exchange data with an external energy storage apparatus; and
   a controller to control the power conversion unit,
   wherein the energy storage device is a first energy storage device that is connected to the first phase from among the three phases of the internal power network when a second energy storage device is connected to a second phase from among the three phases of the internal power network and when a third energy storage device is connected to a third phase from among the three phases of the internal power network,
   wherein the controller receives voltage information of respective phases, calculates discharged power amounts of the respective phases, based on the voltage information of the respective phases, and transmits information of the calculated discharged power amounts to the second and third energy storage devices, and
   wherein the controller controls an amount of power to be supplied to the first phase in the discharging mode based on the voltage information of the respective phases.

2. The energy storage device according to claim 1, wherein the controller calculates amounts of power respectively supplied to the second and third phases, based on an amount of power to be supplied to the first phase in the discharging mode, and performs a control operation to transmit information of the calculated power amounts as to the second and third phases to an outside via the communication module.

3. The energy storage device according to claim 1, wherein the controller controls an amount of charged power converted in the power conversion unit, based on voltage information of the three phases, in the charging mode.

4. The energy storage device according to claim 1, wherein the controller receives information of storable power from the at least one battery pack, calculates an amount of charged power in the charging mode, based on the received storable power information, and controls the power conversion unit, based on the calculated charged power amount.

5. The energy storage device according to claim 1, further comprising:
   a switching unit arranged between the connector unit and the power conversion unit, to prevent generation of an inrush current in the charging mode.

6. The energy storage device according to claim 5, wherein the switching unit comprises an AC relay.

7. The energy storage device according to claim 1, further comprising:
   a power sensor arranged between the connector unit and the power conversion unit, to sense the AC power from the first phase in the charging mode and to sense the converted AC power in the discharging mode; and a cut-off unit to cut off supply of power when a voltage sensed by the power sensor is equal to or higher than a predetermined level.

8. The energy storage device according to claim 1, wherein the controller performs a control operation to initialize a battery controller in the at least one battery pack when the power conversion unit operates, and to charge the at least one battery pack with the AC power input from the first phase in a converted state when the battery controller completes preparation of operation.

9. The energy storage device according to claim 1, wherein the at least one battery pack comprises:
   a battery cell unit comprising a plurality of battery cells;
   a temperature controller to adjust a temperature of the battery cell unit; and
   a battery controller to adjust balance of DC voltages stored in respective battery cells of the battery cell unit.

10. The energy storage device according to claim 9, wherein:
    the temperature controller comprises:
       a temperature sensor; and
       a fan driver to drive a fan, based on a temperature sensed by the temperature sensor; and
       wherein the fan driver is disposed in a region corresponding to an area where the battery cells are arranged.

11. The energy storage device according to claim 9, wherein the battery controller performs a control operation to transmit temperature information of the at least one battery pack and level information of the stored voltages to the communication module.

12. The energy storage device according to claim 1, wherein an AC power including information from a photovoltaic module is output to the internal power network based on power line communication (PLC), and
    wherein the information includes at least one of generated electric power information of the photovoltaic module including a solar cell module, input and output current information of the photovoltaic module, input and output voltage information of the photovoltaic module, operation state information of the photovoltaic module, and error information of the photovoltaic module.

13. An energy storage system comprising:
    a photovoltaic module comprising a solar cell module, and an AC power conversion module to convert DC power supplied from the solar cell module into AC power, and to supply the AC power to an internal power network; and
    a plurality of energy storage devices comprising a first energy storage device, a second energy storage device, and a third energy storage device,
    the first energy storage device comprising at least one battery pack, a power conversion unit to convert, into the DC power, the AC power from a first phase from among three phases of the internal power network in a charging mode, and to convert the DC power stored in the at least one battery pack into the AC power in a discharging mode, and a controller to control the power conversion unit,
    wherein the first energy storage device is connected to the first phase from among the three phases of the internal power network,
    wherein the second energy storage device connected to a second phase from among the three phases of the internal power network,
    wherein the third energy storage device connected to a third phase from among the three phases of the internal power network,
    wherein the controller receives voltage information of respective phases, calculates discharged power amounts of the respective phases based on the voltage information of the respective phases, and transmits information of the calculated discharged power amounts to the second and third energy storage devices, and
    wherein the controller controls an amount of power to be supplied to the first phase in the discharging mode based on the voltage information of the respective phases.

14. The energy storage system according to claim 13, wherein the first energy storage device further comprises:
    a communication module to exchange data with the second energy storage device connected to the second phase from among the three phases of the internal power network, and the third energy storage device connected to the third phase from among the three phases of the internal power network, and
    wherein the controller controls an amount of power to be supplied to the first phase in the discharging mode, based on voltage information of the second and third phases.

15. The energy storage system according to claim 14, wherein the controller calculates amounts of power respectively supplied to the second and third phases, based on the amount of power to be supplied to the first phase in the discharging mode, and transmits information of the calculated power amounts as to the second and third phases to an outside via the communication module.

16. The energy storage system according to claim 13, wherein the controller controls an amount of charged power converted in the power conversion unit, based on voltage information of the three phases, in the charging mode.

17. The energy storage system according to claim 13, wherein the first energy storage device further comprises:
    a connector unit to receive the AC power from the first phase of the internal power network in the charging mode, and to output the AC power converted in the power conversion unit to the first phase in the discharging mode;
    a power sensor arranged between the connector unit and the power conversion unit, to sense the AC power from the first phase in the charging mode and to sense the converted AC power in the discharging mode; and
    a cut-off unit to cut off supply of power when a voltage sensed by the power sensor is equal to or higher than a predetermined level.

18. The energy storage system according to claim 13, wherein the first energy storage device performs a control operation to initialize a battery controller in the at least one battery pack when the power conversion unit operates, and to charge the at least one battery pack with the AC power input from the first phase in a converted state when the battery controller completes preparation of operation.

19. The energy storage system according to claim 13, wherein:
    the at least one battery pack comprises:
       a battery cell unit comprising a plurality of battery cells;
       a temperature controller to adjust a temperature of the battery cell unit; and a battery controller to adjust balance of DC voltages stored in respective battery cells of the battery cell unit; and
wherein the temperature controller comprises:
a temperature sensor; and
a fan driver to drive a fan, based on a temperature sensed by the temperature sensor.

\* \* \* \* \*